(12) United States Patent
Piaton

(10) Patent No.: US 9,035,511 B2
(45) Date of Patent: May 19, 2015

(54) ELECTRIC MOTOR BRAKING SYSTEM FOR ROTOLINEAR ACTUATOR

(75) Inventor: Jérôme Piaton, Paris (FR)

(73) Assignee: Sagem Defense Securite, Paris (FR)

( * ) Notice: Subject to any disclaimer, the term of this patent is extended or adjusted under 35 U.S.C. 154(b) by 415 days.

(21) Appl. No.: 13/141,159

(22) PCT Filed: Nov. 17, 2009

(86) PCT No.: PCT/FR2009/052203
§ 371 (c)(1),
(2), (4) Date: Jun. 21, 2011

(87) PCT Pub. No.: WO2010/072932
PCT Pub. Date: Jul. 1, 2010

(65) Prior Publication Data
US 2011/0254394 A1    Oct. 20, 2011

(30) Foreign Application Priority Data
Dec. 22, 2008    (FR) ..................... 08 58941

(51) Int. Cl.
*H02K 7/10*    (2006.01)
*H02P 15/00*   (2006.01)
*H02P 3/00*    (2006.01)
(Continued)

(52) U.S. Cl.
CPC .............. *F16H 25/2252* (2013.01); *H02K 7/06* (2013.01); *H02K 7/106* (2013.01)

(58) Field of Classification Search
CPC ................... H02K 3/52; H02K 7/06

USPC ........ 310/12.01, 77, 92, 188, 267, 76, 93, 94; 318/380, 640
See application file for complete search history.

(56) References Cited

U.S. PATENT DOCUMENTS 2,080,678 A * 5/1937 Van Horn et al. ...... 310/216.108
2,502,121 A * 3/1950 Beard ................... 310/216.032
(Continued)

FOREIGN PATENT DOCUMENTS

DE    10 2005 048 287    5/2007
EP         1070 827 A2    1/2001
(Continued)

OTHER PUBLICATIONS

MAchine Translation JP10126981 (1998).*
(Continued)

*Primary Examiner* — Tran Nguyen
*Assistant Examiner* — Jose Gonzalez Quinones
(74) *Attorney, Agent, or Firm* — Miller, Matthias & Hull LLP

(57) ABSTRACT

The electric motor consists of a rotor fitted with permanent magnets and comprises a stator the armature of which is made up of two parts: a stack of laminations forming round teeth and a solid tube-shaped field frame made of a material of the stainless steel kind enveloping the said stack of laminations. This armature constitutes a non-disengageable braking system that produces a damping effect in the face of possible movements of its rotor which are brought about and/or imposed by the members with which it collaborates. This motor can be used for driving a roto-linear actuator device with satellite rollers which is used as an actuator for maneuvering the control surfaces of an aircraft, for example an aileron.

7 Claims, 2 Drawing Sheets

(51) Int. Cl.
*F16H 25/22* (2006.01)
*H02K 7/06* (2006.01)
*H02K 7/106* (2006.01)

(56) References Cited

U.S. PATENT DOCUMENTS

| | | | |
|---|---|---|---|
| 2,959,721 A * | 11/1960 | Butler et al. | 318/773 |
| 3,269,199 A * | 8/1966 | Deehan et al. | 74/89.25 |
| 3,648,087 A * | 3/1972 | Kitamura | 310/93 |
| 5,444,348 A * | 8/1995 | Garrec | 318/640 |
| 6,140,728 A * | 10/2000 | Tomita et al. | 310/216.079 |
| 2004/0155537 A1* | 8/2004 | Nakano et al. | 310/51 |
| 2007/0188039 A1* | 8/2007 | Migita et al. | 310/218 |

FOREIGN PATENT DOCUMENTS

| | | |
|---|---|---|
| EP | 1 211 784 A1 | 6/2002 |
| EP | 1 940 012 A1 | 7/2008 |
| FR | 2678597 | 1/1993 |
| JP | 63124756 A * | 5/1988 |
| JP | 10126981 A * | 5/1998 |

OTHER PUBLICATIONS

International Search Report from related PCT Application No. PCT/FR2009/052203, dated Nov. 15, 2010.

* cited by examiner

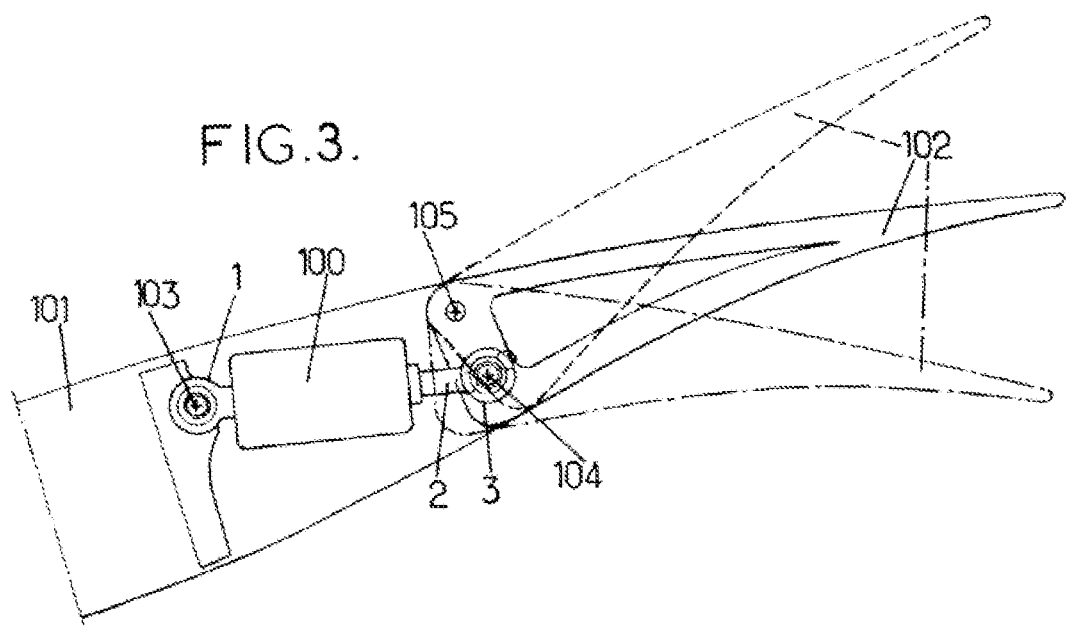
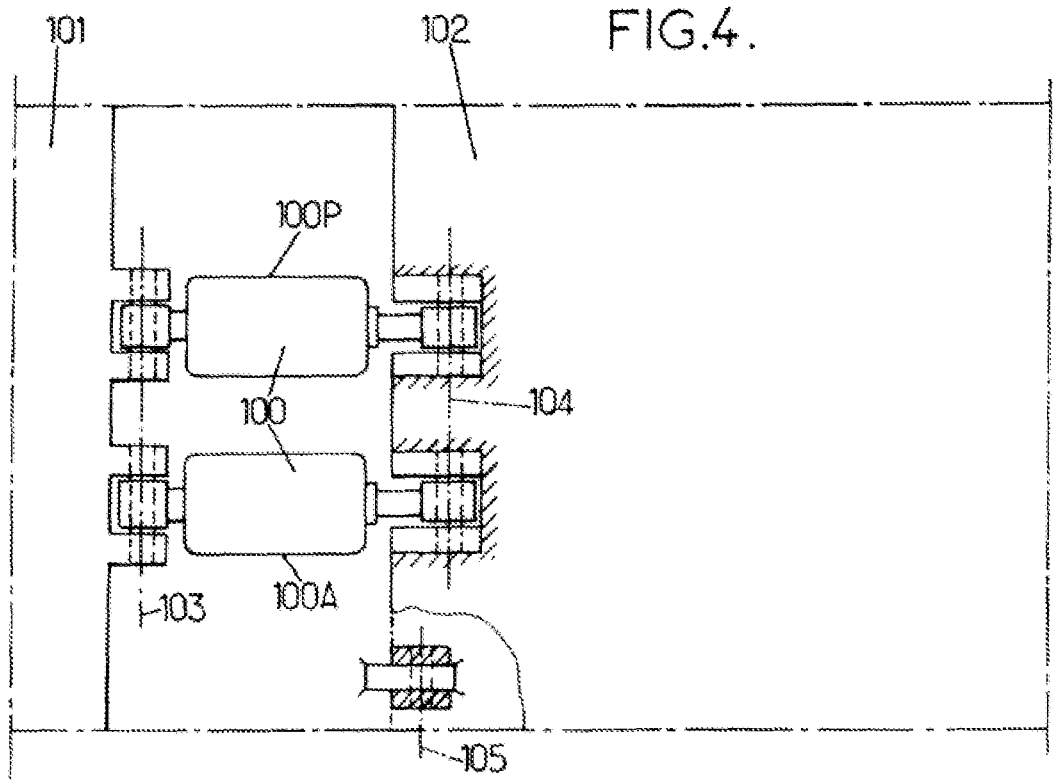

ELECTRIC MOTOR BRAKING SYSTEM FOR ROTOLINEAR ACTUATOR

CROSS-REFERENCE TO RELATED APPLICATIONS

This application is a U.S. national stage filing of International Patent Application No. PCT/FR2009/052203 filed on Nov. 17, 2009, which claims priority under the Paris Convention to French Patent Application No. 08 58941, filed on Dec. 22, 2008.

FIELD OF THE DISCLOSURE

The invention relates to an electric motor and in particular to an electric motor able to drive a reversible actuating device such as a screw jack, and more specifically a rotolinear actuator with satellite rollers.

BACKGROUND OF THE DISCLOSURE

This type of actuating device is useful in numerous applications, and in some applications may even be associated with an energy recovery system or an electromagnetic braking system, for example.

For example, document FR 2 678 597 describes an actuator used in the field of robotics, and in particular an electric actuator which is advantageously substituted for a hydraulic cylinder.

This electric actuator comprises at least one electric motor and a system for recovering the kinetic energy from the device maneuvered by said actuator. The recovery system comprises electronic components and a switch for controlling and operating these recovery means.

The association of an electric motor and an electromagnetic brake, as described in another document EP 1 070 827, is commonly used for actuating shutters or blinds for example.

As described in this document, the electromagnetic brake is a hysteresis brake installed directly onto the motor shaft, between the motor and the torque converter. This brake is utilized, meaning it is made active or inactive, by a control which causes current to flow through a coil that activates or deactivates the braking function.

The above energy recovery and/or braking operations are accompanied by a supplemental effect: a damping of the movements of the device which is normally maneuvered by the electric motor. However, this form of damping requires active control, meaning there must be a positive action by the operator or some other party in order to bring it into play electrically.

For hydraulic cylinders, this damping effect is inherent in the equipment; it results both from the compressibility of the hydraulic fluid and from the general design of the cylinder. This damping does not require active control, as it is always intrinsically present.

SUMMARY OF THE DISCLOSURE

The invention proposes a supplemental damping effect for an electric motor. It is analogous to the damping resulting from the use of a hydraulic cylinder, meaning that this damping effect is always available in all circumstances, without the intervention of an operator.

The invention relates to an electric motor of an actuator which comprises a continuous, non-disengageable, constantly operational braking system, directly linked to its structure. This braking system absorbs a portion of the energy which said electric motor or a driving mechanism associated with said electric motor, depending on the case, is capable of providing.

An active continuous damping is thus obtained for all movements related to the electric motor and the resulting energy is dissipated as heat, said energy being on the order of 2 to 10% of the energy said electric motor or another associated driving mechanism is capable of providing.

Also according to the invention, the electric motor comprises, in the conventional manner, a rotor fitted with permanent magnets and a stator fitted with windings, and the braking system consists of arranging the single internal electromagnetic circuit of said stator in a manner that directly produces by magnetic induction, a friction phenomenon that is both dry, through magnetic hysteresis, and viscous, through eddy currents.

In a preferred embodiment of the invention, the electric motor comprises a stator having an armature consisting of two parts:
 a low-loss stack of laminations, and
 a tube-shaped field frame which surrounds said stack of laminations, obtaining significant losses through hysteresis and eddy currents.

Also according to the invention, the field frame is made of a stainless steel type of material.

In another provision of the invention, the field frame directly constitutes the protective housing for the actuating device.

The invention also relates to the use of this type of electric motor, described above, for driving a screw jack and in particular a rotolinear actuating device with satellite rollers. This actuating device is installed either for directly maneuvering an aircraft flight control surface such as an aileron, or for monitoring the movements of said flight control surface which in this case is maneuvered by another actuating device having an electric motor that is conventional or that comprises an integrated braking system according to the invention.

BRIEF DESCRIPTION OF THE DRAWINGS

The invention will be further detailed in the following description and the attached exemplary drawings, in which:

FIG. 3 is a schematic view, showing a flight control surface, for example an aileron, controlled by rotolinear actuating devices placed between the aileron and the structure of an aircraft wing;

FIG. 4 is a schematic top view showing the location of two rotolinear actuating devices placed between the aileron and the structure of the wing of an aircraft.

DETAILED DESCRIPTION OF THE DISCLOSURE

Figures 1, 2:
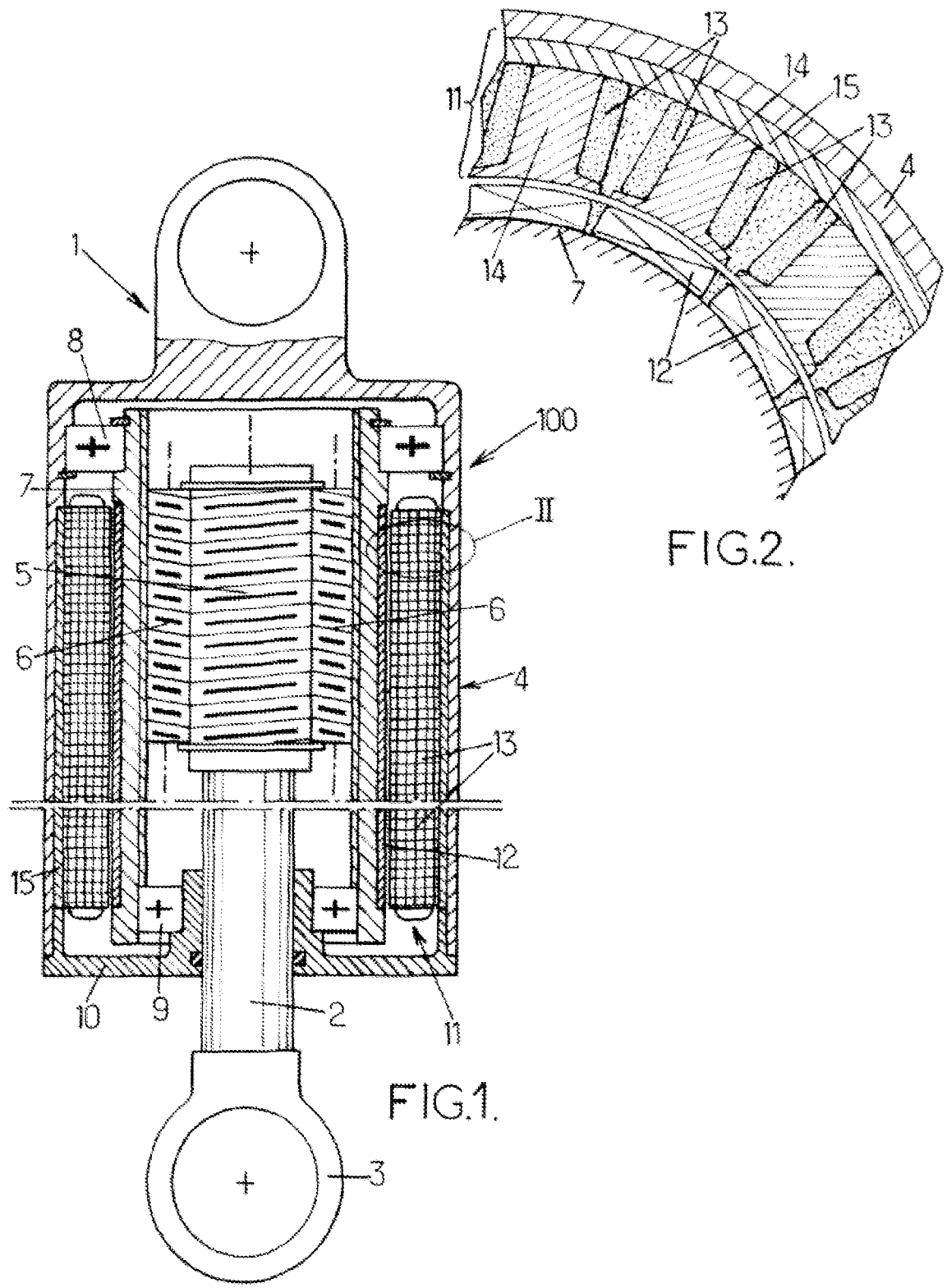
FIG. 1 diagrams a rotolinear actuating device in which the electric motor is arranged to act as a damper for the movements it is subjected to and which it undergoes because of its reversible nature.
FIG. 2 is a cross-section of the structure of the electromagnetic portion of the motor, showing the rotor and the stator.

FIG. 1 shows a diagram of a rotolinear actuating device comprising an integrated electric motor according to the invention.

This actuating device is in the form of a cylinder which comprises a clevis 1 at one end, a removable rod 2 having an eye 3 at the other end, and, between said clevis and said rod 2, a cylindrical sleeve 4 serving as a housing, which encases the electric motor and the mechanism for maneuvering said rod 2.

This rod 2 comprises, in the cylindrical sleeve 4, a threaded portion 5 on which several satellite rollers 6 turn. These rollers 6 are arranged to form a kind of cylinder which is axially fixed relative to the rod 2; these rollers 6 are themselves threaded with the same pitch as that of the rod 2 but inverted relative to the pitch of the rod 2, and they roll on the threaded portion of a sheath 7 which is housed in the cylindrical sleeve 4 of this actuating device, said sheath 7 acting as the rotor (also labeled 7) for the electric motor.

This rotor 7 is rotationally guided relative to the sleeve 4 by roller members 8 and 9 positioned at its ends: one roller member 8 is near the clevis 1 and also serves as an axial stop, and the other roller member 9 is fitted in a cap 10 assembled onto the end of the sleeve 4 and which at the same time also serves to guide the rod 2.

The electric motor therefore consists of the rotor 7 and a stator 11 which is housed in the sleeve 4 of the actuating device, and this electric motor comprises a braking system associated with its structure. Said braking system, in the embodiment detailed below, is directly integrated with the electric motor without making any change to its outer appearance.

The rotor 7 comprises permanent magnets 12 distributed along its periphery, and the stator 11 comprises windings which correspond to conventional electric motor windings.

FIG. 2 shows a partial cross-sectional view of the electric motor consisting of its rotor 7 and its stator 11. The stator 11 is housed in the cylindrical sleeve 4 of the actuator.

The braking system results from a special arrangement of the magnetic circuit of the stator 11, meaning of the inductor. This magnetic circuit of the stator 11 is organized in an armature consisting of an assembly of two tubular parts tightly nested inside one another and, in this embodiment, these two parts are housed in the sleeve 4. These two parts of the stator 11 consist of:
- a sleeve-like part which surrounds the rotor 7 and which comprises T-shaped teeth 14, each consisting of a stack of T-shaped laminations onto which the windings 13 are wound,
- a field frame 15 which surrounds said sleeve-like part and which is in contact with the periphery of said teeth 14; said field frame 15, as represented in FIG. 2, is placed between said stacks of laminations and the sleeve 4.

In another embodiment, the sleeve 4 may constitute the field frame 15, and said field frame serves directly as the casing for the electric motor and the mechanism of the actuating device.

The laminations used to form the teeth 14 of the stator 11 are made of an appropriate material, such as FeSi, meaning a material which has little loss through both hysteresis and eddy currents.

The space between the teeth 14 of the stack of laminations is filled in the conventional manner with resin or other material, and the ensemble forms the sleeve-like part which cooperates with the field frame 15.

This field frame 15 is in the form of a tube of a solid stainless steel type of material. It constitutes a poor magnetic circuit, with losses through eddy currents and hysteresis. These losses, fully exploitable in the context of the application detailed above, offer braking and damping that are both viscous and dry. Dry braking results from magnetic hysteresis and viscous braking from eddy currents.

The displacement of the magnets 12 in front of the armature consisting of the teeth 14 and the field frame 15 gives rise to induction phenomena which result in a braking and damping effect on the movement of the rotor 7. This braking and damping effect is permanent because it results from the design of the stator 11 of the electric motor; it is not disengageable.

The power absorbed by the brake-damper of this electric motor damper is on the order of 2 to 10% of the power said electric motor is capable of providing.

The energy produced by such braking during the movements of the rotor 7 is converted into heat and is directly dissipated in the motor and its environment. As mentioned above, this energy is relatively low because it only concerns a very small portion, about 2 to 10%, of the energy the electric motor is capable of providing during use.

The sleeve 4 forms a protective housing and it can be made of a plastic material. However, in an extreme simplification, the sleeve 4 can also directly constitute the field frame 15.

This damping effect is exploited in the invention to filter out vibrations originating directly from the mechanism maneuvered by the electric motor.

In the case of an aeronautic application of the invention, the damping function of the flight control surfaces is essential, particularly for flight control surfaces such as ailerons which, in certain configurations, may be the site of vibrations known as flutter.

The rotolinear actuating device of the invention is particularly suitable for maneuvering aircraft flight control surfaces, for several reasons. Firstly, the movements of the rod 2 are relatively small in amplitude, and the displacement speed of the rod 2 is also relatively low most of the time. For commercial aircraft, it is less than 1 mm/s for at least 80% of the flight time and is less than 2 mm/s for at least 97% of the flight time.

The actuating device is directly connected to the aileron; the torque of the electric motor is significant while the reduction ratio and rotational speed of said electric motor are low.

The damping provided by the motor of the invention is purely magnetic, and is independent of the state of the electric circuit of said motor, which can be either an open or short circuit. The damping is greater if, for example, the electric circuit of the electric motor is accidentally shorted.

FIG. 3 represents a schematic of a rotolinear actuating device 100 integrated into an aircraft wing, in particular between the structure 101 of said wing and an aileron 102.

The clevis 1 of the actuating device 100 is pivotably mounted in the structure 101 of the wing by means of a pin 103, and the rod 2 of the actuator, which is mobile, is connected by its eye 3 to the aileron 102 by means of a pin 104, in a manner which causes said aileron 102 to rotate on its hinge pin 105 which is integrally attached to the wing structure 101.

The movements forced onto this passive actuating device cause the production of electrical energy, due to the design of the electric motor integrated into this actuating device; this produced energy is directly dissipated in the winding 13. To produce this energy, the motor functions as a brake and this braking effect is used to dampen the movements of the aileron 102.

In fact, as represented in FIG. 4, the aileron 102 is able to be maneuvered by multiple rotolinear actuating devices, two for example, and these rotolinear actuating devices 100 are installed in the same manner between the aileron 102 and the structure 101 of the wing, by means of a pin 103 for the structure 101 and a pin 104 for the aileron 102.

Of the two rotolinear actuating devices 100, the actuating device 100A is active, and the other actuating device 100P is passive; the passive actuating device 100P acts as a replacement or backup. It comes into play if there is an incident or failure affecting the normally active actuating device 100A serving as the mechanism for maneuvering the aileron.

Generally, only one actuating device is used; the other device is placed in service if there is a failure in the first actuating device. The actuating device 100A may therefore comprise a conventional electric motor without a brake/damper, and it is the backup actuating device 100P which serves as the brake/damper, with the knowledge that it can take over for the other actuating device 100A when needed if a failure occurs. The energy absorbed in such an assembly is limited to the energy of a single brake/damper actuating device.

All the movements caused by the active actuating device 100A are transmitted to the passive actuating device 100P by means of the aileron; said passive actuating device reacts due to its reversibility.

Such damping capability in these actuating devices results directly from the design of the electric motor and can be made use of in any field in which this type of equipment is used.

The invention thus guarantees the damping of vibrations no matter what the state of the electric circuit of the motor and the state of its electronic components; the availability of the damping is continuous and high; there is very low risk of losing the damping function because it does not depend on outside intervention.

This damping function is almost guaranteed, unless the magnets 12 of the rotor 7 are lost or the magnetization of these magnets is lost.

The invention claimed is:

1. An electric motor, comprising:
   a rotor; and
   a stator fitted with windings and having an armature including
   a low-loss stack of laminations that form teeth; and
   a tube-shaped field frame which surrounds said stack of laminations and is made of stainless steel type of material,
   wherein the electric motor comprises a continuous, non-disengageable, constantly operational braking system, directly linked to its structure, said braking system obtaining losses on the order of 2% to 10% of the power said electric motor is capable of providing through magnetic hysteresis and eddy currents.

2. An electric motor according to claim 1, wherein the field frame serves as a housing of the electric motor.

3. An electric motor according to claim 1, wherein the tube-shaped field frame serves as a housing of the electric motor.

4. An electric motor according to claim 1, wherein the electric motor is used for driving a screw jack and in particular a rotolinear actuating device with satellite rollers, said actuating device being installed either for directly maneuvering an aircraft flight control surface such as an aileron, or for monitoring the movements of said flight control surface by maneuvering another actuating device having an electric motor that is conventional or that comprises the braking system.

5. An electric motor according to claim 1, wherein each tooth and corresponding winding constitutes a magnetic stator pole, and wherein the various stator poles are not connected between them by a stack of laminations.

6. An electric motor according to claim 1, wherein the tube-shaped field frame comprises spaces between each adjacent teeth, said spaces being filled with resin.

7. An electric motor according to claim 1, wherein said braking system obtaining losses on the order of 6% to 10% of the power said electric motor is capable of providing through magnetic hysteresis and eddy current.

* * * * *